Patented Oct. 9, 1934

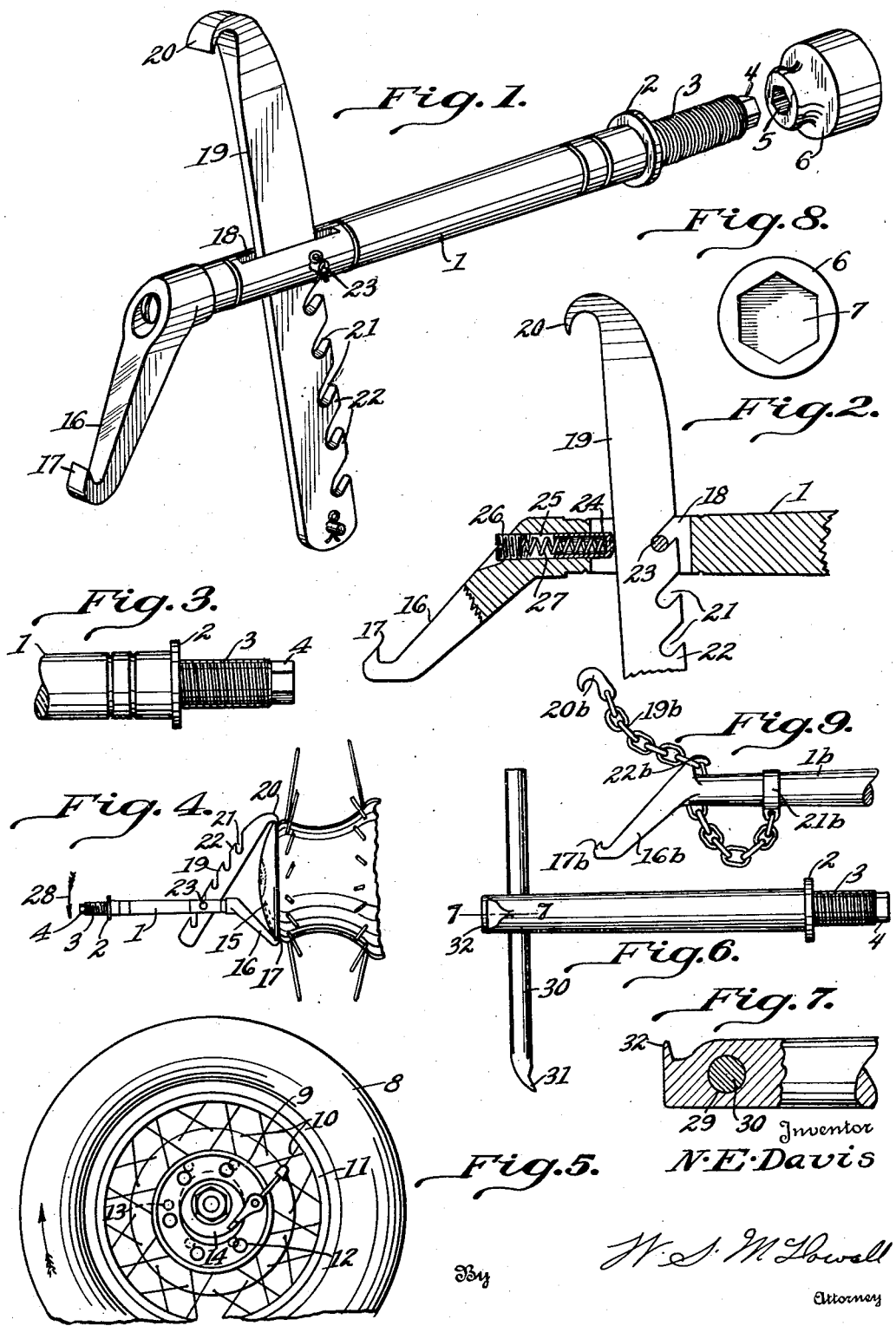

1,975,773

UNITED STATES PATENT OFFICE 1,975,773

MOTOR VEHICLE WHEEL TOOL

Newton E. Davis, Columbus, Ohio

Application March 21, 1933, Serial No. 661,950

2 Claims. (Cl. 29—84)

This invention relates to an improved motor vehicle wheel tool, and an object of the invention resides in the provision of a simple and efficient tool constructed so that it may be conveniently manipulated to facilitate the removal of the securing bolts or nuts used in mounting a motor vehicle wheel, especially wheels of the wire spoke type on separable supporting hubs or axles and, additionally, to facilitate the remounting and securing of the wheels on such hubs or axles as a given operation of this kind may require.

It is a further object of the invention to construct the shank of the tool at one end to provide a claw means for facilitating the removal of spring-pressed cap plates from the wheel hub. Usually, motor vehicle wheels of the wire spoke type have their hubs provided with separable cap plates, which may be removed from the hubs in order that access to the interior thereof may be had to remove or apply the bolts employed in mounting the wheel in connection with an axial supporting or driving member. These cap plates are retained in place by the provision of circumferential springs which cooperate with the interior walls of the wheel hub body. It is a matter of some difficulty for the average motor vehicle operator, particularly under emergency conditions, to apply the proper degree of force to the cap plates to overcome their frictional mounting and separate the same from the hub. By the tool comprising the present invention, provision is made in the construction of the claw mechanism at one end thereof to enable these caps to be removed expeditiously and conveniently.

A still further object of the invention resides in providing the tool to include a removable bolt engaging socket member at one end thereof and to form this end of the tool with a threaded extension, whereby said extension may be received in threaded bolt openings formed in the axial supporting or driving members which normally receive the bolts used in uniting the wheels with such members, in order that when the threaded extension of the tool is so positioned, said tool may serve as a pivoting axis, about which the wheel may be rotated or adjusted in order to facilitate the alignment of the bolt openings formed in the hub thereof with the threaded bolt receiving openings formed in said axial members, to the end of facilitating registration between these openings and permitting of the convenient insertion of the usual securing bolts therein.

Another object of the invention rests in constructing the claw means to vary or adjust the effective width of the same in order that the tool may be adapted to cap plates of differing diameter.

With these and other objects in view, which will appear as the description proceeds, the invention consists in the novel features of construction, combination of elements and arrangements of parts hereinafter fully described and pointed out in the appended claims.

In the accompanying drawing:

Fig. 1 is a perspective view of the improved motor vehicle wheel tool comprising the present invention;

Fig. 2 is a vertical longitudinal sectional view taken through the outer end of the tool and disclosing the fixed and pivoted claw members and the means for regulating the pivotal adjustment of the pivoted claw member;

Fig. 3 is a detail view in side elevation disclosing the inner end of the tool provided with a threaded extension, the removable socket member being omitted;

Fig. 4 is a detail view disclosing the manner of employing the tool in the removal of the cap plate from the hub of a motor vehicle wheel;

Fig. 5 is a side elevation illustrating the manner of employing the tool as a pivotal support for the vehicle wheel in facilitating the operation of mounting such a wheel on an axial support;

Fig. 6 is a detail view in side elevation of a slightly modified form of the invention wherein the pivoted claw member is omitted;

Fig. 7 is a detail sectional view on the line 7—7 of Fig. 6;

Fig. 8 is an end view of the removable socket member employed in connection with the tool.

Fig. 9 is a detail view of a still further modified form of the invention.

Referring more particularly to the drawing and especially the form of the invention disclosed in Figs. 1 to 5, the numeral 1 designates the longitudinally extending shank of the implement, preferably, the shank is formed from tool steel or its equivalent to possess the necessary strength and durability in the performance of the operations for which it is adapted. Adjacent to one end, which may be called the inner end for convenience in description, the tool is provided with a flange 2, and beyond this flange the shank is provided with a threaded extension 3 of a diameter somewhat less than that of the corresponding end of the shank. Preferably, the threaded extension possesses a diameter corresponding to that of the securing bolts, not shown, employed in mounting a motor vehicle wheel on an axial supporting member, in order, as will be explained hereinafter in reference to the showing in Fig. 5, that said extension may be used to facilitate the mounting of a removed wheel in connection with its axial supporting member.

The threaded extension 3 terminates in a reduced polygonal extension 4 which is receivable within a corresponding socket 5 formed in a removable bolt turning socket member 6. As shown in Fig. 8, this socket member may be provided with a bolt receiving socket 7 which is of a size to correspond with or receive the heads of the securing bolts employed in the mounting of a vehicle wheel. Thus when the socket member is secured upon the extension 4, the tool may be employed after the manner of a socket wrench in either tightening or removing the usual threaded bolts used in the mounting of a wire spoke motor vehicle wheel on an axial supporting or driving member.

The tool is also quite useful in the matter of registering the bolt receiving openings formed in the hub of the wheel with corresponding openings formed in a wheel supporting or driving member. By reference to Fig. 5, the numeral 8 designates a wire spoke motor vehicle wheel which includes the usual hub 9 used in connecting the tangentially disposed spokes 10 with the tire band 11 of the wheel. The numeral 12 designates the bolt openings in the hub of the wheel which are adapted to be registered with corresponding openings 13, disclosed in dotted lines, formed in connection with the axial supporting or driving member 14 of a motor vehicle upon which the wheel 8 is mounted. When it is necessary to mount a wheel of this kind, the socket member 6 is removed, which permits the threaded extension 3 of the tool to be passed through one of the openings 12 of the hub 9 and thence threaded into a registering opening 13 of the member 14. This enables the tool to function as a pivoting axis so that the wheel may be partially revolved about an eccentric axis and the openings 12 and 13 positioned in close registration, so that the ordinary securing bolts may be readily threaded therein and the remounting of the wheel completed.

Another operation which is a source of considerable difficulty in demounting motor vehicle wheels is the operation of removing the separable cap plate 15 from the front of the hub 9. These cap plates are held in position in or on the hub by circumferential springs, not shown, which exert considerable frictional pressure on the interior of the hub. Due to the strength of these springs and also to corrosion and the presence of dirt or mud, it is a very difficult matter to pry or remove these cap plates from their positions of application on wheel hubs. I therefore have provided means in connection with the tool comprising the present invention whereby this operation can be performed quickly and easily.

In the preferred form of the invention, the end of the tool opposite to the threaded shank 3, and which may be referred to as the outer end, terminates in an angularly offset fixed jaw member 16, and the outer end of this jaw member 16 terminates in an in-turned knife edge claw 17. Also, the shank of the tool, contiguous to the jaw member 16, is formed with an elongated longitudinally extending slot 18 in which is pivotally mounted, for swinging movement in the plane of the fixed jaw member, a second or adjustable jaw member 19. Preferably, the jaw member 19 partakes of the form of a flat bar having its upper or outer end terminated in an inturned claw 20 which is complemental to the claw 17.

To vary the distance or spacing of the stationary and movable claws 17 and 20, respectively, the said adjustable jaw member 19 is in this instance provided along one of its edges with a plurality of pivoting sockets 21 formed between rack teeth 22. The sockets 21 may be selectively engaged with a transversely disposed pivoting pin 23, which may be removably mounted in connection with the walls of the slot 18. To maintain the pin 23 in pivoting contact with the walls of a selected socket 21, I preferably employ a plunger 24 slidably mounted in an opening 25 provided in connection with the outer end of the tool shank 1. The outer end of the opening 25 is closed by means of a removable plug 26, and between this plug and the plunger 24 there is positioned a coil spring 27, which exerts sufficient pressure so that the plunger will engage constantly with the smooth edge of the adjustable jaw member 19, thereby tending to force this jaw member into proper pivoting engagement with the pin 23. To vary the spacing of the jaw members, it is necessary merely to grasp the adjustable jaw member and force the same toward one end of the slot 18 against the resistance of the plunger 24. The length of the slot is such that when this is done, the adjustable jaw member will clear the pin 23, allowing said member to be moved freely transversely of the slot 18.

By this construction, the tool serves to facilitate the removal of a cap plate as shown in Fig. 4. By reference to this figure, it will be noted that the claw 17 at the lower end of the jaw member 16 readily wedges itself between the circumferential edge of the cap plate 15 and the corresponding edge portion of the wheel hub 9. When in this position, the claw 17 acts as a fulcrum, against which the lever may be rocked in the direction indicated by the arrow 28. Since the adjustable jaw member has its claw 20 in engagement with the upper portion of the cap plate, it follows that upon rocking the tool in the direction of the arrow 28, when the tool is mounted as shown in Fig. 4, easy executed pressures may be applied to the cap plate to cause its dislodgement from frictional association with the wheel hub.

While the construction disclosed in Figs. 1 to 5 is especially useful in connection with most motor vehicle wheels, yet in more popularly priced motor vehicles, using smaller wheels, a more simplified type of tool may be employed. Thus in Figs. 6 and 7, the tool shank 1 has its outer end provided with an opening 29 in which is positioned a transversely extending member 30, having at least one of its ends terminated in a claw 31, which may be used in prying the cap plate from a wheel hub. Likewise, the outer end of the tool shank may be provided with a claw 32 for performing a similar operation. The threaded inner end of the tool shank disclosed in Fig. 6 corresponds exactly with that disclosed in the preferred form.

In Fig. 9, the tool comprises a shank 1b which is equipped at its outer end with a stationary jaw member 16b terminating in a claw 17b. The adjustable jaw member is indicated at 20b and is connected by means of a chain 19b with an eye member 21b secured to the shank 1b. The shank is also formed with a hook 22b with which any one of the links of the chain 19b may be connected, whereby to vary the effective length of the chain and to adapt the tool to the diameter of a given hub cap.

Various other modifications will suggest themselves to those skilled in the art, and therefore the above description and the accompanying drawing are to be considered in a descriptive or illustrative sense only and not by way of precise limitations.

What is claimed is:

1. A motor vehicle wheel tool comprising a tool shank, a fixed jaw member formed with said shank at its forward end and projecting angularly and outwardly therefrom, a claw terminal provided on the outer end of said jaw member, a rearwardly extending hook formed with the shank on the opposite side from the fixed claw, a separate jaw member, and a flexible member adjustably connecting said separate jaw with said hook.

2. A motor vehicle wheel tool comprising a tool shank, an angularly and outwardly directed projection at the forward end of said shank, a claw terminal provided on the outer end of said projection, a hook formed with the shank at its forward end, a second jaw member, and a flexible connection between said second jaw member and said hook.

NEWTON E. DAVIS.